(12) United States Patent
Uraki et al.

(10) Patent No.: US 6,415,039 B2
(45) Date of Patent: Jul. 2, 2002

(54) IMAGE DATA MERGING SYSTEM (75) Inventors: Naotake Uraki; Syuichi Satake, both of Toyama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/021,580

(22) Filed: Feb. 10, 1998

(30) Foreign Application Priority Data

Aug. 29, 1997 (JP) .............................................. 9-234067

(51) Int. Cl.[7] ................................................. G06K 9/00
(52) U.S. Cl. ...................................... 382/100; 382/284
(58) Field of Search ................................ 382/100, 112, 382/284; 358/450; 345/435, 629, 634

(56) References Cited

U.S. PATENT DOCUMENTS

| 5,257,119 A | * 10/1993 | Funada et al. ............... 358/438 |
| 5,309,245 A | * 5/1994 | Hayashi et al. .............. 358/296 |
| 5,647,010 A | * 7/1997 | Okubo et al. ................ 382/100 |
| 5,701,184 A | * 12/1997 | Motoyama ................... 358/450 |
| 5,737,454 A | * 4/1998 | Park et al. ................... 382/284 |
| 5,822,660 A | * 10/1998 | Wen ............................. 399/194 |

FOREIGN PATENT DOCUMENTS

EP 0 493 091 * 7/1992 .......... H04N/1/387

OTHER PUBLICATIONS

Szepanski, "A Signal Theoretic Method for Creating Forgery–Proof Documents for Automatic Verification," *Proc. of the 1979 Carnahan Conf. on Crime Countermeasures*, May 16–18, 1979, pp. 101–109.*

Matsui et al., "Video–Steganography: How to Secretly Embed a Signature in Picture," *IMA Intellectual Property Project Proceedings*, vol. 1, No. 1, Jan. 1994, pp. 187–205.* van Schyndel et al., "A Digital Watermark," *Proc. IEEE Int. Conf. Image Proc.*, Nov. 13–16, 1994, pp. 86–90.*

Ohnishi et al., "Embedding a Seal into a Picture under Orthogonal Wavelet Transform," *IEEE Proc. of MULTIMEDIA '96*, Jun. 17–23, 1996, pp. 514–521.*

* cited by examiner

*Primary Examiner*—Andrew W. Johns
(74) *Attorney, Agent, or Firm*—Staas & Halsey LLP

(57) ABSTRACT

An image data merging system includes a first input unit for inputting original information and temporarily storing the input original information as image information, a second input unit for inputting identification information and temporarily storing the input identification information as image information, and an image merging unit for merging the original information temporarily stored in the first input unit and the identification information temporarily stored in the second input unit with each other in accordance with a predetermined rule.

12 Claims, 5 Drawing Sheets

| NO. | ID |
|-----|----|
| 1 | α |
| 2 | β |
| 3 | γ |
| ... | ... |

FIG.5

☆PRINT DOCUMENT

```
AAA
IIIII
UUUUU

EEEE
OOOOO
```
—1-PAGE—

```
KaKaKaKaKa
KiKiKi
   THAT IS ALL
```
—2-PAGE—

☆SPECIFIDE PATTERN(CONTINUOS NUMBER)

| TYPE OF NUMBER | NUMERAL |
| --- | --- |
| INITIAL VALUE | 1 |
| ADDED CHARACTER STRING | "EMPLOYEE NO." |
| POSITION OF NUMBER | FOLLOWING ADDED CHARACTER STRING |

☆PRINT RESULT

FIRST SET

```
AAA
IIIII
UUUUU EMPLOYEE NO.1

EEEE
OOOOO
```
—1-PAGE—

```
KaKaKaKaKa
KiKiKi
EMPTHAT'S ALL
```
—2-PAGE—

SECOND SET

```
AAA
IIIII
UUUUU EMPLOYEE NO.2

EEEE
OOOOO
```
—1-PAGE—

```
KaKaKaKaKa
KiKiKi
EMPTHAT'S ALL
```
—2-PAGE—

THIRD SET

```
AAA
IIIII
UUUUU EMPLOYEE NO.3

EEEE
OOOOO
```
—1-PAGE—

```
KaKaKaKaKa
KiKiKi
EMPTHAT'S ALL
```
—2-PAGE—

FIG.6

IMAGE DATA MERGING SYSTEM

BACKGROUND OF THE INVENTION (1) Field of the Invention

The present invention generally relates to an image data merging system, and particularly to an image data merging system which merges other information and original information to be recorded as image data in various types of recording mediums. In the present invention, the image data is defined as information which can be shown on a sheet or displayed on a screen so as to be recognized by the human eye and includes position information regarding where the image data is located on the sheet or the screen. Thus, information of mere characters and symbols is not included in the image data. Information which satisfies the above conditions and exists in another medium, such as a memory, a file or a network, may be included in the image data. Information to which a data compression process is applied to reduce storage space and transmission time and information which is ciphered to keep the information secret may be included in the image data.

(2) Description of the Related Art

The image data can be provided to users in the forms of prints made by a printer of a computer system, text images transmitted by facsimile machines, copied images obtained by copying information recorded on sheets by copy machines, image data (electronic files) displayed on a screen of a display unit, other products made by equipment having the above functions combined with each other and files intermediately stored.

The image data recorded in the sheets and files is copied and distributed to supply many users. A large number of paper publications on which the image data is printed and electronic publication, such as floppy disks and CD-ROMs, in which the image data is recorded, are often distributed.

In the above example, to inhibit unfair acts such as pirating of the distributed information, various measures have been taken. For example, in the first example, parts of documents, such as covers or margins of respective pages, are provided with names of destinations or numbers corresponding to destinations in order to know the destinations to which the documents should be distributed even if the documents (secret documents) are stolen from companies or copied.

In the second example, a merge printing function of a word processor is used. According to the merge printing function, in a case such as an invitation card, an address of a destination, a name of a company, a name of a department, a post office box and a persons name can be printed at predetermined positions on a document so as to be merged with original information. Specified information other than the information of the destination may be printed so as to be merged with the original information. For example, in a case such as text of a direct mail, specified names are located so as to be scattered on the direct mail.

In the third example, in a case where an owner of copyright of publication using an electronic medium permits a publishing company to use image data included in the publication, identification information is merged as an electronic watermark information with the image data. As a result, the identification information corresponding to the permitted publishing company can be detected from the image data of the publication or a copy thereof (NIKKEI ELECTRONICS, Feb. 24, 1997. (NO.683), p. 99–115).

However, in the above first example, since identification information, such as the names and numbers, are provided (printed) on the a cover of the publication or in the margins of the respective pages, the identification information added to the publication can be easily separated from original information which should be published. Thus, only the original information which should be published can be copied with malicious intent.

In the above second example using the merge printing function, original text data must be formed so that positions at which the information selected from the destination list should be merged are specified using special symbols. Thus, it is difficult to change the form of the original information to be published to a form by which the merge printing can be performed. In addition, since the identification information is merged at predetermined positions in the same manner as in the first example, only the original information can be copied by concealing the identification information.

In the third example, although the identification information can be merged with the original image data so as to be distinguished from the original image data, the quality of the original image data deteriorates. Thus, usually, the identification information is merged with the image data so that the identification information is not recognized by human eyesight in the image data displayed on a screen. The identification information can be recognized, by an electronic device, in a state where the identification information and the original image data are electronically recorded. The identification information can not be recognized from a print on which the original image data is formed.

As has been described above, the conventional system has the disadvantages in which the merged information can be easily separated from the original image information, the identification information can not be merged with the original image information if the format of the original image information is changed and the identification information can not be detected from prints on which the original image information is formed.

SUMMARY OF THE INVENTION

Accordingly, a general object of the present invention is to provide a novel and useful image merging system in which the disadvantages of the aforementioned prior art are eliminated.

A specific object of the present invention is to provide an image data merging system by which identification information can be merged with original information with each of authorized copies so as to be recognized as image information without deterioration of the equality of the original information formed on a paper or displayed on a screen.

A second object of the present invention is to provide an image data merging system by which identification information can be merged with original information as image information so as to be inseparable from the original information and concealed.

The above objects of the present invention are achieved by an image data merging system comprising: first input means for inputting original information and temporarily storing the input original information as image information; second input means for inputting identification information and temporarily storing the input identification information as image information; and image merging means for merging the original information temporarily stored in the first input means and the identification information temporarily stored in the second input means with each other in accordance with a predetermined rule.

According to the present invention, a user can recognize the original information along with the identification information merged as image information with the original information.

The identification information can be merged with original information with each of authorized copies (reproductions) so as to be recognized as image information without deterioration of the quality of the original information formed on a paper or displayed on a screen. In addition, the identification information can be merged with original information as image information so as to be inseparable from the original information and concealed.

As a result, the original information can be prevented from being unfairly reproduced (copied).

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given, with reference to FIG. 1, of the principle of an image data merging system according to an embodiment of the present invention.

Figure 1:
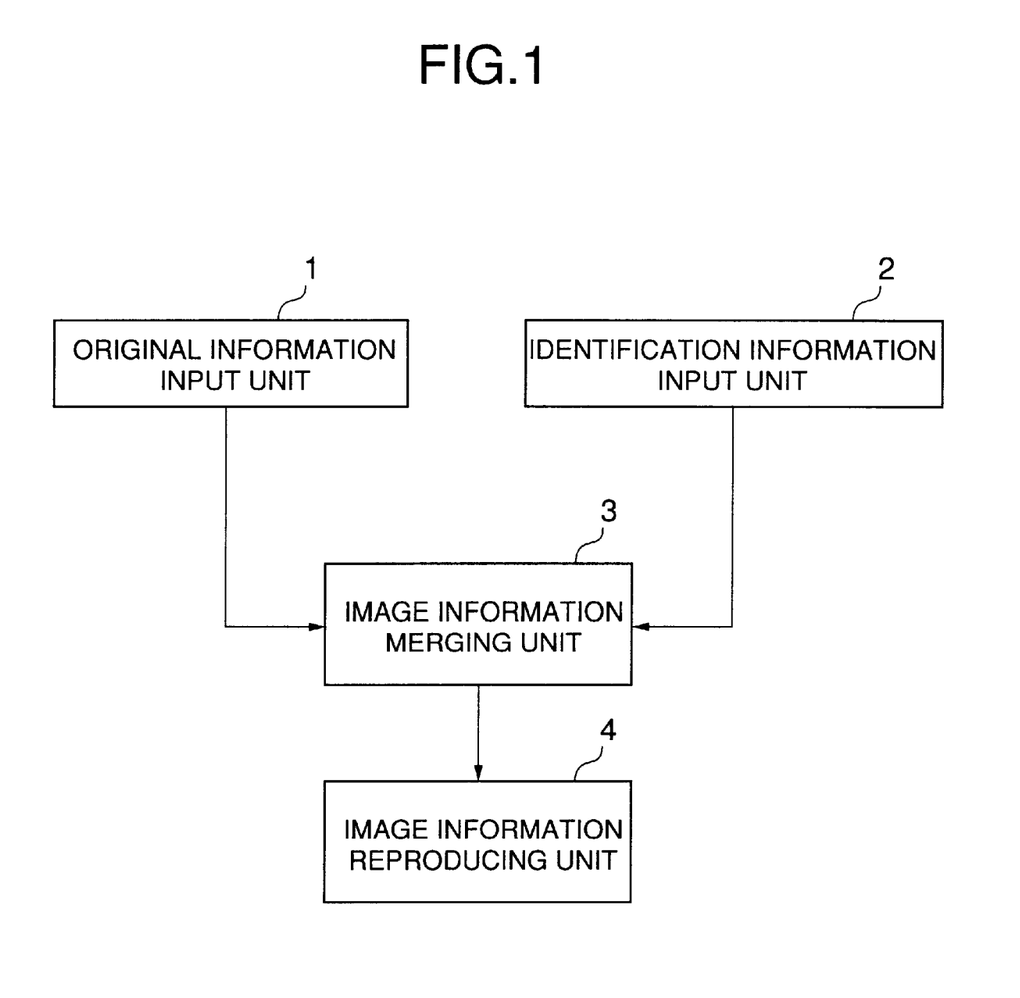
FIG. 1 is a block diagram illustrating a principle of an image merging system according to an embodiment of the present invention.

Referring to FIG. 1, the image data merging system has an original information input unit 1, an identification information input unit 2, an image information merging unit 3 and an image information reproducing unit 4. The original information input unit 1 inputs original information and temporarily stores it as image information. The identification information input unit 2 inputs identification information and temporarily stores it as image information. The image information merging unit 3 merges the original information and the identification information both of which are stored as image information so that composite image information is formed,. The image information reproducing unit 4 records the composite image information in a medium.

A description will now given of an embodiment of the present invention.

In the embodiment, the image data merging system is formed in a general purpose computer, such as a personal computer or a workstation.

The image data merging system is embodied by a computer program executed by a computer system having a processing unit, a main storage unit, an auxiliary storage unit and an input/output unit. The computer program is supplied to the computer system using portable media such as floppy disks or CD-ROMs or from a main storage unit or an auxiliary storage unit of another computer system connected to a network. The computer readable recording medium according to the present invention corresponds to the portable media, the main storage unit or the auxiliary storage unit.

The computer program stored in the portable media may be directly loaded into the main storage unit of the computer system, or loaded into the main storage unit after the computer program is copied or installed from the portable media to the auxiliary storage unit. In a case where the computer program is supplied from another system connected to the network, the computer program received from the other system via the network is copied to the auxiliary storage unit and loaded into the main storage unit.

Figure 2:
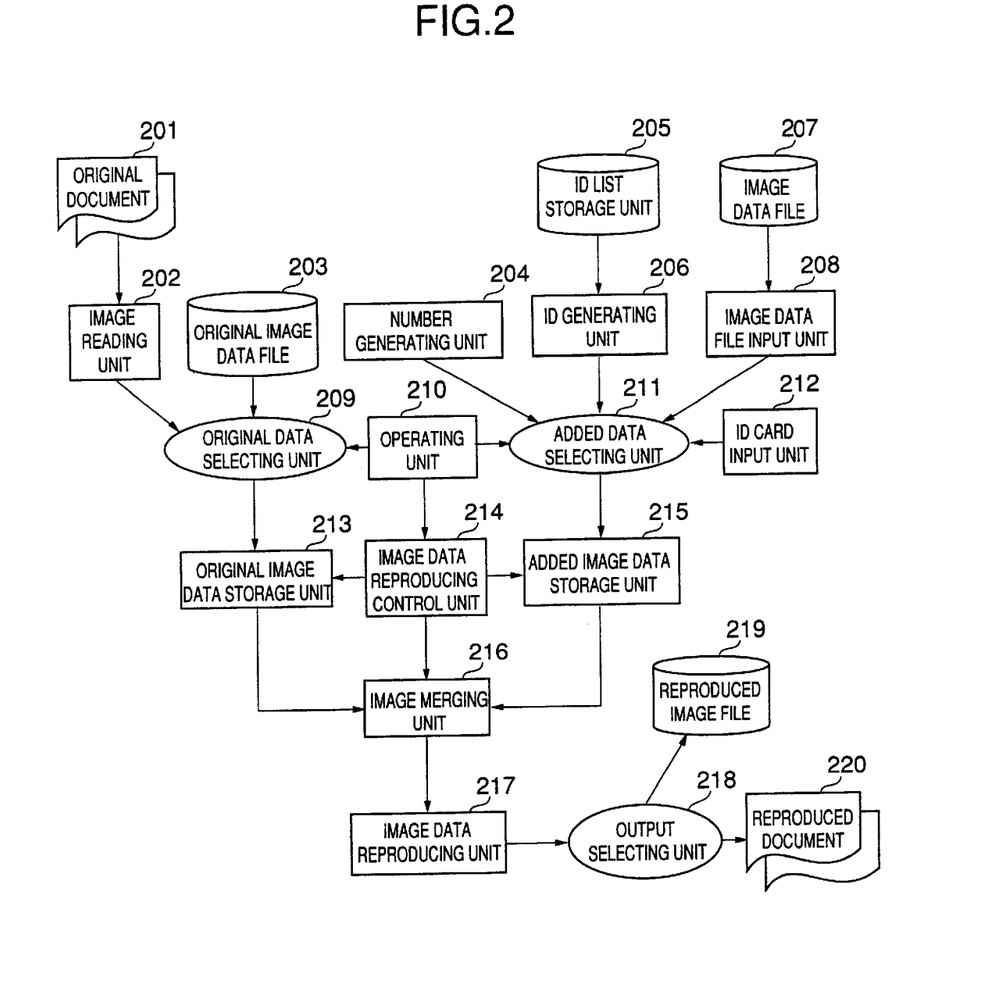
FIG. 2 is a block diagram illustrating an image merging system according to an embodiment of the present invention.

FIG. 2 shows an image data merging system according to an embodiment of the present invention. In the image data merging system, an original document 201 printed on a paper as original data and an original image data file 203 recorded in an electronic medium may be reproduced and copied in a plurality of numbers. Continuous numbers which are successively generated, character information items, image information items such as a plurality of photographs or illustrations which have been previously prepared or identifiers indicated on ID cards which are presented at need are merged as different added data (representing images) with the original data for every set of the reproductions. As a result, a reproduced document 220 or reproduced image file 219 is made.

The image data merging system has the original document 201, an image reading unit 202, an original image data file 203, a number generating unit 204, an ID list storage unit 205, an ID generating unit 206, an image data file 207, an image data file input unit 208, an original data selecting unit 209, an operating unit 210, an added data selecting unit 211, an ID card input unit 212, an original image data storage unit 213, an image data reproducing control unit 214, an added image data storage unit 215, an image merging unit 216, an image data reproducing unit 217, an output selecting unit 218, a reproduced image file 219 and a reproduced document 220. The original document 201, the image reading unit 202, the original image data file 203, the original data selecting unit 209 and the original image data storage unit 213 form the original information input unit 1 shown in FIG. 1. The number generating unit 204, the ID list storage unit 205, the ID generating unit 206, the image data file 207, the image data file input unit 208, the ID card input unit 212, the added data selecting unit 211 and the added image data storage unit 215 form the identification information input unit 2 shown in FIG. 1. The image merging unit 216 corresponds to the image information merging unit 3 shown in FIG. 1. The image data reproducing unit 217, the output selecting unit 218, the reproduced image file 219 and the reproduced document 220 form the image information reproducing unit 4 shown in FIG. 1.

The operating unit 210 is operated by a user to activate the system and select original data and added data (identification information) to be merged with the original data. Original data selected by the operating unit 210 is supplied to the original image data storage unit 213 via the original data selecting unit 209 and added data selected by the operating unit 210 is supplied to the added image data storage unit 215 via an added data selecting unit 211. The original data and the added data are temporarily stored in the original image data storage unit 213 and the added image data storage unit 215 respectively. The image data reproducing control unit 214 activated by the operating unit 210 activates the image merging unit 216 so that the two kinds of image data items are merged by the image merging unit 216.

The image data reproducing unit 217 supplies imaged data into which the original data and the added data are merged to an output medium set by the operating unit 210. Thus, the original data such as the original document is merged with the identification information (an identification pattern) and reproduced set by set.

A detailed description will now be given of the reproduction of image data merged with identification information.

Figure 3A:
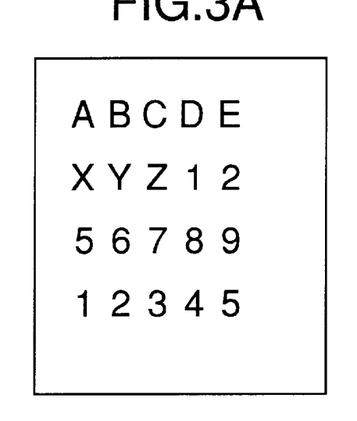
FIGS. 3A, 3B, 3C and 3D are diagrams illustrating examples of composite images.
Figure 3B:
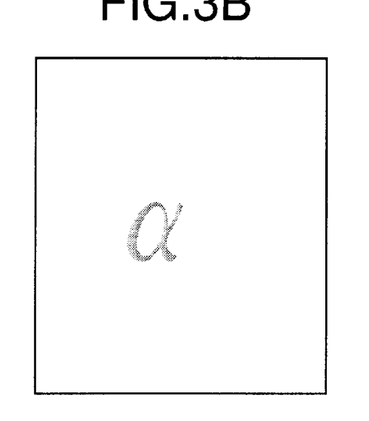
Figure 3C:
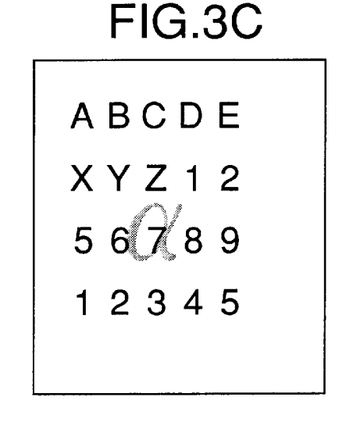
Figure 3D:
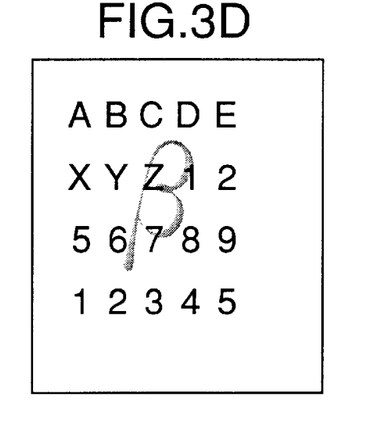

FIG. 3A shows an example of original image data, FIG. 3B shows an example of added data (identification information) and FIGS. 3C and 3D show examples of image data printed on sheets so as to be merged with added image data.

The original image data shown in FIG. 3A corresponds to a document for one page in which character strings "ABCDE", "XYZ12", "56789" and "12345" are arranged in four lines. The document may include graphics and/or images. The document may be printed on a paper, stored in a file and electrically read by means of a scanner and edited by a document processing apparatus (e.g., a word processor).

The added data shown in FIG. 3B is identification information and a kind of image. The added data may be any pattern, such as graphics, photographs, numbers and characters, if the pattern can have a meaning as the identification information. Since the added data must be merged with the original image data, an image corresponding to the added data may be of a light density and expanded in a broad area, in general. A character patter of "α" shown in FIG. 3B is of a light density and enlarged. The added data is not limited to a single character,,but may be a character string including a plurality of characters.

The image data shown in FIG. 3C is formed by merging two kinds of image with each other. In the image data, the pattern α as the identification information is located behind the original image data. The identification information is merged as image data with a reproduced document or a reproduced file in an electronic medium. When the document merged with the identification information is printed or when the file merged with the identification information is displayed, the user can recognize the owner of the document or the file based on the identification information merged therewith. In the image data shown in FIG. 3D, the added data "β" is substituted for the added data "α" shown in FIG. 3C. If the added data such as "α" or "β" is unique, the root of unfairly copied image data can be determined based on the added data merged into the image data.

Figure 4:
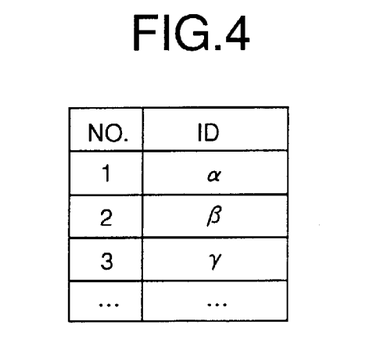
FIG. 4 is a diagram illustrating a list of IDs to be added.

FIG. 4 shows an example of an ID list stored in the ID list storage unit 205 shown in FIG. 2. In the ID list, ID information items "α", "β", "τ" . . . are listed. The respective ID information items which are merged as images into a plurality of reproductions of the original data identify destinations to which the reproductions should be distributed. The ID information items "α", "β" and the like are stored as character codes. In a printing operation, a character pattern identified by the character code is enlarged and/or changed into a pattern having a light density.

Instead of the list of the character codes representing the ID information items, a plurality of files of image data items may be stored in the image data file storage unit 207. The image data items are merged as backgrounds into the reproductions so that the reproductions are distinguished from each other.

In the above example, the original data which is normal character information and a pattern obtained by enlarging the identification information having a light density are logically added so as to be merged with each other. Only parts of the identification information which are located on those parts of the original data preferentially located on a paper or screen may be effective so as to be merged with the original data. The identification information may be displayed on the background of the original data in color. The method for merging two kinds of image (the identification information and the original data) may be decided based on outward appearance of the composite image. Two kinds of image may be superposed by printing two times.

A description will now be given of operations in a case where a plurality of sets of reproduction are printed.

Figure 5:
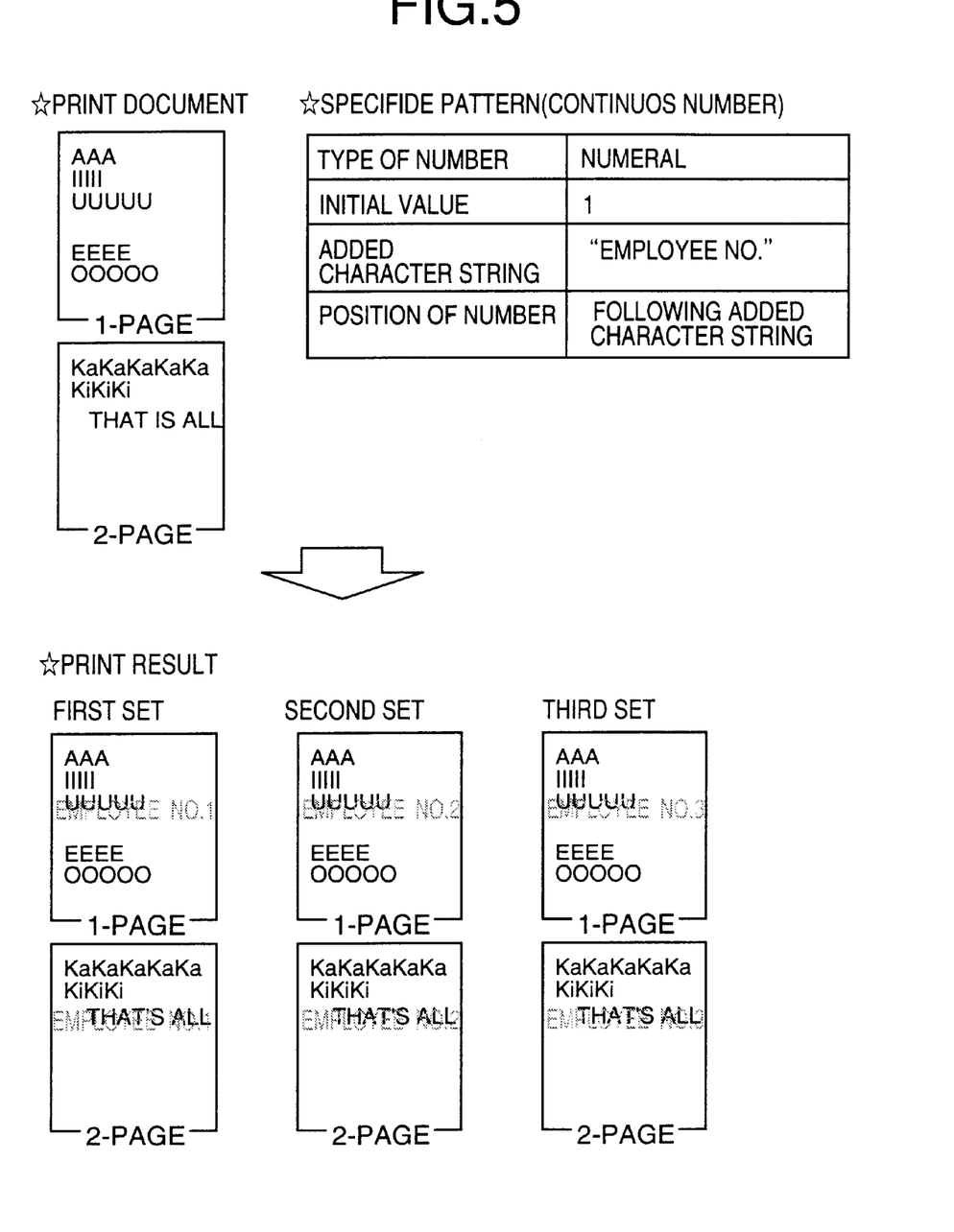
FIG. 5 is diagram illustrating examples of a plurality of sets of prints.

FIG. 5 shows an example of a case where a plurality of sets of reproduction are printed. In the case shown in FIG. 5, a document to be printed includes a first page of "AAA, . . . , OOOOO" and a second page of "KaKaKa, . . . , that is all". In this case, the document having two pages is printed as three sets. The three sets of the printed reproduction are distributed to employees. On each page of each of the sets, a employee number identifying a corresponding employee is lightly printed as the identification information in the background.

A pattern specified as the identification information is formed of a character string of "EMPLOYEE No." and a numeral which follows the character string. The initial value of the numeral is "1". Character patterns corresponding to character codes representing the character string and the numeral are enlarged and the density of the character patterns is specified. The Character patterns are printed as a background image with the specified density so as to be merged with the specified document. As a result, in the first print set of the reproduction, charter patterns of "EMPLOYEE NO.1"are merged with the original "AAA, . . . , OOOOO" in the first page and the original "Kakaka, . . . , that is all" in the second page.

In the second and third set of the reproduction, character patterns "EMPLOYEE NO.2" and "EMPLOYEE NO.3" are respectively merged with the originals in the first and second pages in the same manner as in the case of the first print set.

Figure 6:
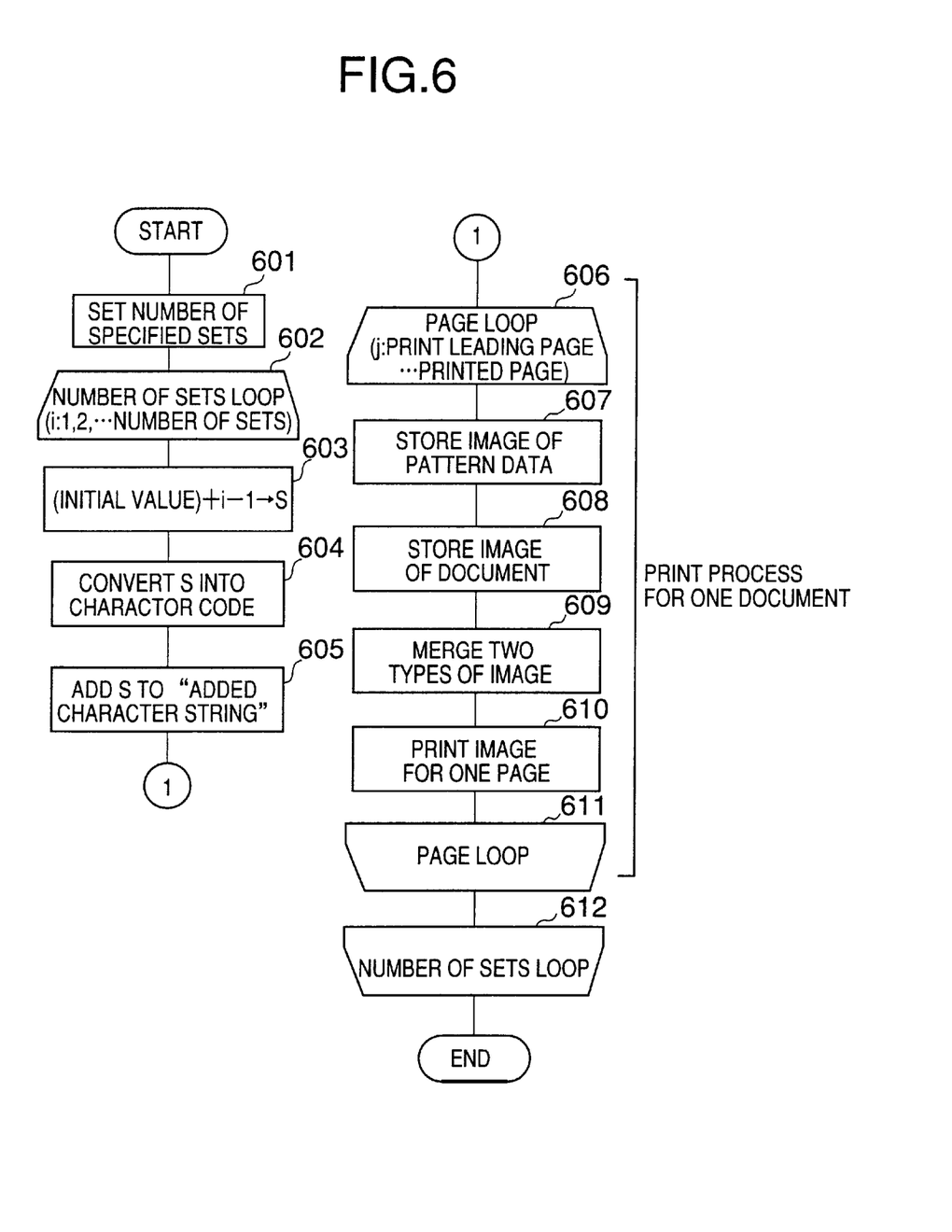
FIG. 6 is a flowchart illustrating a printing process for a plurality sets of prints.

FIG. 6 shows a procedure of the printing process as described above.

Referring to FIG. 6, in step S601, the number of sets of printed reproduction is set. In a processing loop including steps S602 through S612, a process for counting the number of sets and a process for controlling generation of continuous numerals are performed. That is, in step S602, a variable i is set at a value which is varied from 1 to the number of sets set in step S601. In step S603, a variable S representing a continuous numeral is calculated using the variable i set in step S602.

In step S604, the variable S which is a continuous numeral is converted into character codes. In step S605, the numeral follows the specified character string so that a character pattern is formed.

In a processing sub-loop including steps S606 through S611, a process for printing a document set is performed. That is, the character pattern including the continuous numeral set in the above process is merged as an image into the respective pages from the leading page to the end page.

In step S607, the character pattern including the numeral and the specified character string is enlarged and the density adjustment is performed so that character pattern data is temporarily stored.

In step S608, image data of the document to be printed is expanded and temporarily stored in the storage unit. In step S609, the character pattern and the document which are two types of image data are merged so that composite image data is formed. In step S610, a printing operation using the composite image data is performed.

In the above example, the continuous number is used as the identification information to be merged with the original data. Various kinds of data may be used as the identification information. For example, in a case where the ID card input unit 212 is used, an ID stored in the ID card can be merged as the identification information with the reproduced original information. In a case where the system according to the present invention is used for copy operations of a copy machine, the management of reproductions (copied documents) which should be distributed and for which departments are responsible can be performed. As a result, the document is prevented: from being wastefully copied.

In the above example, the document is reproduced on a paper medium. The reproduction of information electronically or magnetically stored in a recording medium can be performed in the same manner as in the case of the paper medium. For example, the identification information representing an owner can be merged with image information recorded in electronic or magnetic recording media which are reproduced and distributed. When the image information is read out from the medium and a corresponding image is displayed, the identification information is also displayed. Thus, it is determined, based on the identification information, whether the image information is wastefully used.

The identification information can be merged with the original data so as to be superposed on the original data.

The present invention can be applied to the reproductions of image information transmitted through a communication line such as a telephone line and a network (e.g., the reproductions of files transmitted through the internet and faxed image information).

The present invention is not limited to the aforementioned embodiments, and other variations and modifications may be made without departing from the scope of the claimed invention.

What is claimed is:

1. An image data merging system comprising:
   first input means for inputting original information and temporarily storing the input original information as image information;
   second input means for inputting pre-selected identification information and temporarily storing the input pre-selected identification information as image information, the pre-selected identification information indicating whether an object is fairly produced from the original information;
   image merging means for merging the original information temporarily stored in said first input means and the pre-selected identification information temporarily stored in said second input means with each other in accordance with a predetermined rule; and
   a production unit for producing the merged original information and the pre-selected identification information,
   the pre-selected identification information indicating that the merged original information and the pre-selected identification information are fairly produced.

2. The image data merging system as claimed in claim 1, wherein the predetermined rule is a rule in accordance with which the identification information is merged with the original information so as to be located background of the original information.

3. The image data merging system as claimed in claim 1 further comprising:
   means for recording composite information obtained by said image merging means in a medium.

4. The image data merging system as claimed in claim 3, wherein identification information includes a plurality of different items each of which should be merged into information recorded in one of a plurality sets of media.

5. The image data merging system as claimed in claim 3, wherein a medium on which the original data should be reproduced is formed of one sheet or more on which visible image information should be recorded.

6. The image data merging system as claimed in claim 1, wherein the original information is document information edited by a document processing apparatus.

7. The image data merging system as claimed in claim 1, wherein said second input means inputs the identification information recorded in an ID card.

8. A computer readable medium storing a program causing a computer to execute processes of an image data merging system, comprising:
   a first input unit for causing said computer to input original information and temporarily store the input original information as image information;
   a second input unit for causing said computer to input pre-selected identification information and temporarily storing the input pre-selected identification information, the pre-selected identification information indicating whether an object is fairly produced from the original information;
   an image merging unit for causing said computer to merge the original information temporarily stored by said first input unit and the pre-selected identification information temporarily stored by said second input with each other in accordance with a predetermined rule; and
   a production unit for producing the merged original information and the pre-selected identification information,
   the pre-selected identification information indicating that the merged original information and the pre-selected identification information are fairly produced.

9. A method for merging image data, comprising:
   inputting original information and temporarily storing the input original information as first image information;
   inputting pre-selected identification information and temporarily storing the input pre-selected identification information as second image information;
   merging the first image information with the second image information to produce a merged output image, wherein the second image information indicates whether the original information has been fairly produced; and
   producing the merged first image information and the second image information,
   the second image information indicating that the merged first image information and the second image information are fairly produced.

10. A method for merging image data, comprising:
    inputting original information and temporarily storing the input original information as first image information;
    inputting identification information and temporarily storing the input identification information as second image information, the identification information indicating whether an object is fairly produced from the original information;
    merging the first image information with the second image information to produce a merged output image, wherein the second image information identifies a destination to which the merged output should be distributed; and producing the merged second image information and the second image information, the second image information indicating that the merged first image information and the second image information are fairly produced.

11. An image data merging system comprising:

first input means for inputting original information and temporarily storing the input original information as image information;

second input means for inputting pre-selected identification information and temporarily storing the input pre-selected identification information as image information, the pre-selected identification information indicating whether an object is fairly produced from the original information;

image merging means for merging the original information temporarily stored in said first input means and the pre-selected identification information temporarily stored in said second input means with each other in accordance with a predetermined rule; and a production unit for producing the merged original information and the pre-selected identification information, the pre-selected identification information being unrelated to the production of the merged original information and the pre-selected identification information, wherein the pre-selected identification information appears on a fairly produced object but does not appear on an unfairly produced object.

12. An image data merging system comprising:

a first input unit to input pre-selected identification information;

a second input unit to input original information;

an image merging unit to merge the original information and the pre-selected identification information; and a production unit to produce an object from the merged original information and the pre-selected identification information, the pre-selected identification information appearing on the object if fairly produced but not appearing on the object if unfairly produced.

* * * * *